(12) United States Patent
Göring et al.

(10) Patent No.: US 9,423,536 B2
(45) Date of Patent: *Aug. 23, 2016

(54) MEASURING DEVICE WITH A REDUCED SHARE OF STRAY LIGHT

(71) Applicant: Trimble Jena GmbH, Jena (DE)

(72) Inventors: Hermann Göring, Jena (DE); Michael Vogel, Schleifreisen (DE)

(73) Assignee: Trimble Jena GmbH, Jena (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/789,193

(22) Filed: Jul. 1, 2015

(65) Prior Publication Data

US 2015/0323713 A1 Nov. 12, 2015

Related U.S. Application Data

(62) Division of application No. 12/852,903, filed on Aug. 9, 2010, now Pat. No. 9,110,153.

(30) Foreign Application Priority Data

Aug. 25, 2009 (DE) .......................... 10 2009 028 861

(51) Int. Cl.
*G02B 5/04* (2006.01)
*G01C 3/02* (2006.01)
(Continued)

(52) U.S. Cl.
CPC .. *G02B 5/04* (2013.01); *G01C 3/02* (2013.01); *G01S 7/4812* (2013.01); *G02B 3/0006* (2013.01); *G02B 7/1805* (2013.01); *Y10T 29/49828* (2015.01)

(58) Field of Classification Search
CPC .......... G02B 5/04; G02B 7/1805; G01C 3/02; G01S 7/4812

USPC ................ 359/601, 613, 614, 738, 831, 900; 356/4.01

See application file for complete search history.

(56) References Cited

U.S. PATENT DOCUMENTS

| 4,634,223 | A | 1/1987 | Ishii |
| 5,206,746 | A | 4/1993 | Ooi et al. |

(Continued)

FOREIGN PATENT DOCUMENTS

| CN | 1650227 A | 8/2005 |
| EP | 1 234 722 A2 | 8/2002 |

(Continued)

OTHER PUBLICATIONS

Non-Final Office Action mailed on Dec. 10, 2013 for U.S. Appl. No. 12/852,903, 8 pages.

(Continued)

*Primary Examiner* — Ricky D Shafer
(74) *Attorney, Agent, or Firm* — Kilpatrick Townsend & Stockton LLP (57) ABSTRACT

A device for measurement by means of a light ray is equipped with a covering device for reducing stray light. The device comprises an array of lenses along an optical axis; a prism attached to one of the lenses with a slanted surface for coupling of the light ray incident from a light source placed lateral to the optical axis, onto the optical axis, so that the light ray can pass through the array of lenses along the optical axis; a receiver for receipt of a share of the light ray reflected by an object; and a covering device for at least one area of the prism that scatters a share of the light ray as stray light to the receiver.

16 Claims, 6 Drawing Sheets

(51) Int. Cl.
 *G01S 7/481* (2006.01)
 *G02B 3/00* (2006.01)
 *G02B 7/18* (2006.01)

(56) References Cited

U.S. PATENT DOCUMENTS

| | | | | |
|---|---|---|---|---|
| 5,774,208 | A * | 6/1998 | Abe | G01V 8/14 356/4.01 |
| 5,838,504 | A | 11/1998 | Ichikawa et al. | |
| 6,377,409 | B2 | 4/2002 | Kanai | |
| 6,545,749 | B1 * | 4/2003 | Andersson | G01C 3/08 356/4.01 |
| 6,775,077 | B1 | 8/2004 | Feng | |
| 6,894,767 | B2 * | 5/2005 | Ishinabe | G01C 3/08 356/5.01 |
| 7,193,792 | B2 * | 3/2007 | Bernhard | G01C 15/00 359/722 |
| 7,485,864 | B2 * | 2/2009 | Gotz | G01B 11/0658 250/353 |
| 7,672,049 | B2 * | 3/2010 | Fruhmann | G01C 3/08 359/399 |
| 8,839,526 | B2 * | 9/2014 | Hinderling | G01C 15/002 33/292 |
| 9,110,153 | B2 * | 8/2015 | Goring | G01S 7/4812 |
| 2005/0146689 | A1 | 7/2005 | Iechika et al. | |
| 2006/0114448 | A1 * | 6/2006 | Andersson | G01C 3/18 356/4.06 |

FOREIGN PATENT DOCUMENTS

EP     1 528 358 A1    5/2005
WO    WO2006/056475   *  6/2006

OTHER PUBLICATIONS

Final Office Action mailed on Jun. 5, 2014 for U.S. Appl. No. 12/852,903, 7 pages.
Non-Final Office Action mailed on Dec. 4, 2014 for U.S. Appl. No. 12/852,903, 6 pages.
Notice of Allowance mailed on Apr. 13, 2015 for U.S. Appl. No. 12/852,903, 7 pages.

* cited by examiner

MEASURING DEVICE WITH A REDUCED SHARE OF STRAY LIGHT

CROSS-REFERENCES TO RELATED APPLICATIONS

The present application is a Divisional application of U.S. patent application Ser. No. 12/852,903, filed Aug. 9, 2010 which claims priority to German Patent Application No. 10 2009 028 861.9, filed Aug. 25, 2009, entitled "MEASURING DEVICE WITH A REDUCED SHARE OF STRAY LIGHT," the disclosure of which is hereby incorporated by reference in its entirety.

BACKGROUND OF THE INVENTION

The present invention relates to a device for measuring by means of light rays, for example a distance-measuring device, with a reduced share of stray light.

Measuring devices that use a light ray, such as laser beams, to for example measure the distance between the measuring device and an object of interest, are well known. In such devices a light beam is sent in the visible or invisible range, such as a laser beam, through a lens array and a share of the light beam reflected by the object passes through the lens array again and is received by a detector of the measuring device. From the received signal, the distance of the measuring device to the object can be derived, for example through measurement of path time or phase measurement of the emitted light signal to the received light signal.

Such known devices for measurement employing a light beam usually use the optical lens array do not merely send and receive the light signal for distance measurement, for example, but also use the lens array as an optical device for searching for and aligning the device to the object of interest. For this purpose, an eyepiece can be made available to the user, or a sensor for generating an image on a screen.

One distance-measuring device is known from US 2006/0114448. In this distance-measuring device, a prism is connected to a lens array, to couple laterally emitted light into an optical axis. The mirror or prism is placed in the central area of the lens array on the optical axis. Measurement light reflected from an object is collimated by the lens array and directed to a detector that preferably lies in the focus of the array. Since the detector, viewed optically, is behind the coupled prism, not all the light that is reflected from the object reaches the detector array. The detector can receive only such light reflected from the object as usable light, which is incident through the optical lens array and past the prism to the detector.

Due to placement of the prism in the optical path of the lens array and because the prism is designed to be small, to permit as much measurement light as possible to be incident on the receiver, especially when the measurement light is coupled into the optical path through the mirror or prism, crosstalk effects result, which impair the quality of the measured result. Stray light or reflected light generated in the measuring device by the light beam can be incident on the receiver as stray light, and impair the ratio of usable light to stray light.

In the process of overall technical development it is desirable to be able to measure greater distances to the object, and thus use light sources with greater power output. With a higher power class, for example with a stronger laser, stray light also becomes greater and the precision of the measured result is determined by the ratio of usable light to stray light. Therefore, in such devices with a greater power class, the dynamic range must be expanded. When distance is measured, the stray light is included, and thus, for example, when usable light undergoes a fourfold amplification if a higher power class for example is used, stray light is increased by a factor of 4, which does not increase the dynamic range, i.e., the distance from usable light to stray light.

SUMMARY OF THE INVENTION

Therefore, it is desirable to further improve the dynamic range for a device to measure using a light beam. Especially it is desirable, in a device for measuring by means of a light beam to reduce the share of stray light incident on the receiver which is generated within the device.

This problem of the invention is solved by the features of the independent patent claims. Advantageous embodiment forms are found in the dependent patent claims.

DETAILED DESCRIPTION OF THE INVENTION

Figure 1:
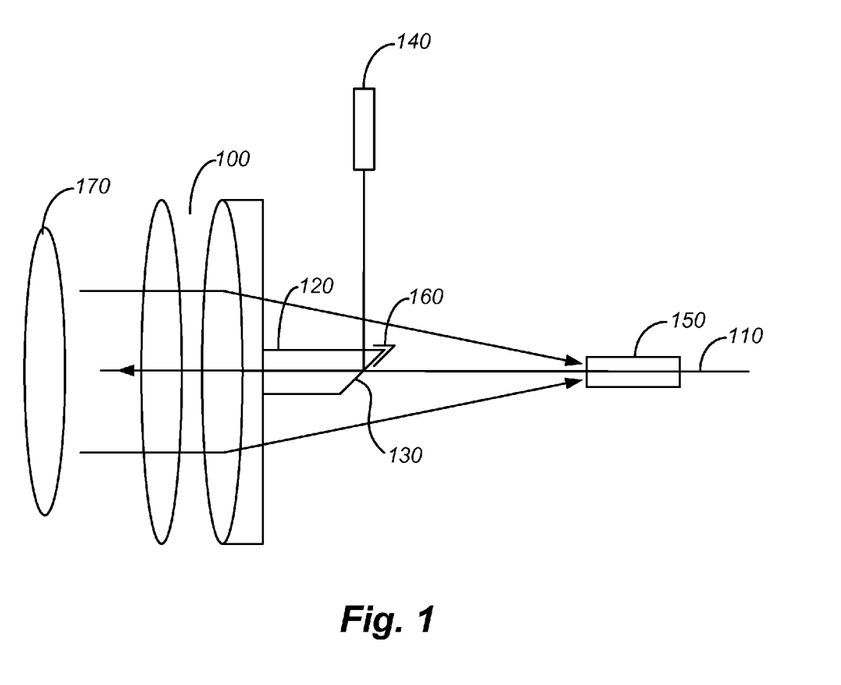
FIG. 1 shows a device for measurement by means of a light beam as per an embodiment form of the invention.

FIG. 1 shows a schematic arrangement of a device for measurement by means of a light ray according to one embodiment form.

Generally, for example, the device can be used in measurement or surveying devices with a telescope or camera as a distance measuring device. Light to measure, for example, the distance to an object is coupled to the optical axis and measurement light reflected from the object is detected and evaluated by the receiver. Very generally the device can however be used to measure by means of a light ray, in every optical device in which an optical telescope is used for measurement coaxial to a light ray. A laser source or another light source can be used as the light source.

The device for measuring by means of a light ray as per the present embodiment form comprises an array of lenses 100 along an optical axis 110, a prism 120 placed on one of the lenses with a slanted surface 130 for coupling the light ray incident from a light source 140 lateral to the optical axis onto optical axis 110, so that the light ray passes through the array of lenses 110 along optical axis 110. A receiver 150 for receipt of a share of the light ray reflected by an object 170 is made available. Further, according to the invention, a covering device 160 is made available for at least one area of the prism that scatters a share of the light ray as stray light. The stray light can be a reflected or scattered share of the light ray.

Since the measurement light reflected back is an order of magnitude less than the emitted measurement light, the received reflected measurement light must be detected by sensitive devices. One problem with such sensitive receiving devices is stray light that is incident on the receiver along with usable light reflected by an object. The precision of the measurement process is determined by the ratio of usable light to stray light, i.e. on the ratio of the received measurement light reflected from the object to the stray light. Sources of stray light are light sources that not only lie outside the device, but stray light is also generated within the device for measuring by means of a light ray, and in fact especially by scattering or reflection of the light ray that is emitted by light source 140. This light ray is reflected or scattered on components of the device, and is directly or indirectly incident on receiver 150, thus increasing the share of stray light.

The light ray is particularly scattered or reflected when the light ray is coupled to the optical axis through edges of prism 120 or at the point of connection of prism 120 with the lens array 100. For coupling of the light ray from light source 140 onto optical path 110, the prism 120 is preferably placed in the center area of lens array 100, thus in the path of the light ray reflected from the object. Therefore, stray light arising through the prism when the light ray is coupled onto the optical path is especially disadvantageous, because it is generated in the reception path and is incident on receiver 150.

Therefore it is especially desirable to reduce stray light when the light ray is coupled into optical path 110 on prism 120. For example, a large prism could be used, so that the light ray is incident only in the central area of the prism onto slanted surface 130, not onto the edges, and thus stray light is eliminated. However, a larger prism also covers a larger area of the reception path, which causes usable light coming from the receiver to be lessened. A further possibility would be to make available an apertured partition on light source 140, to reduce stray light emitted from light source 140. However, apertured partitions cause optical effects that impair the usability of the light ray, and in addition reduce the intensity of the measurement light, which obviously is not desirable.

Therefore, according to the present embodiment example, covering device 160 is made available, which covers those areas of prism 120 that participate in generating stray light due to the incident light ray for measurement. Covering in this regard may mean that the covering device is so placed that the light ray is not incident on scattering or reflecting areas of the prism, such as the edge area of the prism, or that the covering device is so placed that a light ray scattered by areas of the prism is hindered from being incident on receiver 150. The covering device does not have to lie directly on the scattering or reflecting area of the prism, but rather it may suffice if the covering device lies in the propagation path of the stray light in the direction of the receiver.

One schematic example for a covering device 160 is shown in FIG. 1, and here it covers the upper area of slanted surface 130 in the area of the upper edge of the prism. The upper edge area on slanted surface 130 of the prism is especially disadvantageous when stray light is generated, since the edge can have a chamfer, i.e. the edge may be slanted or chamfered, and thus participate especially in the generation of stray light. However, the embodiment forms described here are not limited to the shown form of covering device 160, the covering device as also described in additional embodiment forms can be placed at this or another place on the prism in various forms.

In advantageous fashion the covering device 160 is configured so that it prevents stray light from being generated through the emitted light beam from light source 140, or [prevents] stray light generated through reflection or scattering of the light ray from being incident on receiver 150. However, at the same time it is so placed that as small a share of usable light as possible, i.e., of measured light reflected from the object, is covered, i.e. prevented from being incident on receiver 150. Thus, as viewed in the direction of the optical axis, the covering device has a small extension going out over the lateral surfaces of prism 120, so that only a little usable light that passes through lens array 100, is shadowed by the covering device. However, along the optical axis the extension of the covering device can be greater, since areas of the covering device which lie parallel to the optical axis, scarcely shadow any received light.

For example, the covering device may project out over a cross section lying at a right angle to the optical axis of the prism by a length which is chosen so that the ratio of usable light to stray light is maximal. The usable light is a share of the measurement light incident on the receiver, reflected by the object, and the stray light is a share of the measured light incident on the receiver that is reflected or scattered by the prism.

The array shown in FIG. 1 is an example. The invention-specific device for measurement by means of a light ray is not limited thereto. For example, covering device 160 can have another form and be in another position. If received light is directed to the receiver by mirrors or similar devices, receiver 150 can be placed at an angle to axis 110 in FIG. 1.

Additionally, a control and evaluation device, not shown in FIG. 1, can be provided, to evaluate the received signal at receiver 150, and for example, compute a distance to an object. Such evaluation and computation procedures are generally known from prior art, and require no further explanation at this point.

In addition, the control device can be arranged to focus the device by means of the lens array on an object of interest. The lenses can for example be shifted relative to each other for focusing, as is generally known.

Additionally, the device can be equipped with a target-search device which makes it possible for a user, for example by means of an eyepiece, to align the device through the lens array on an object of interest and appropriately focus it. As an alternative, a camera can also be situated to depicted a scenario detected by the device, and correspondingly to focus on an object of interest. Additionally, a device can be situated to automatically track an object, for example by image processing procedures carried out in the control device and correspondingly marked or shaped objects of interest.

As an example, in FIG. 1, light source 140 is placed at right angles to the optical axis of the device. For coupling of the light ray emitted by light source 140, the prism therefore has a slanted surface 130 tilted by 45°, as is evident in FIG. 1. However, alternatively, light source 140 can be placed not at right angles to optical axis 110, and the prism may have a tilted slant surface 130 that has a different tilt, to couple the light ray emitted from the light source onto the optical axis.

The lens array 100, the prism 120, the light source 140 and the receiver 150 are known from prior art and require no further explanation at this point.

One manufacturing process for the device for measurement by means of a light ray as per FIG. 1 comprises placement of lenses 100 along an optical axis 110; placement of a prism 120 on one of the lenses, with the prism having a slanted surface 130, for coupling of the light ray incident from a light source 140 placed lateral to the optical axis onto the optical axis 110, so that the light ray can pass through the array of lenses 100 along optical axis 110; placement of a receiver 150 for receipt of a share of the light ray reflected by an object; and placement, on the prism, of a covering device 160 for at least one area of the prism that scatters or reflects a share of the light ray as stray light to the receiver.

Figure 2A:
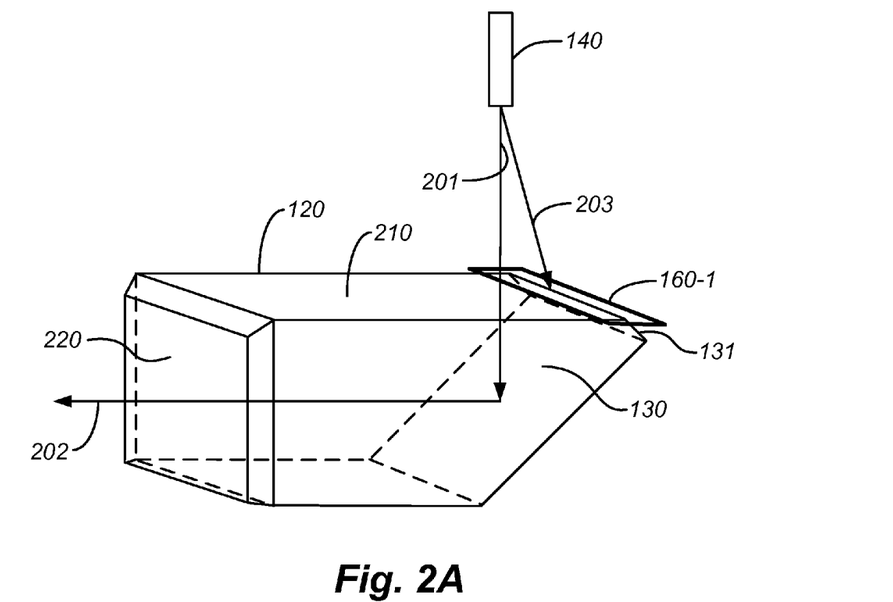
FIGS. 2a and 2b show examples of a prism with a covering device to eliminate stray light as per embodiment forms of the invention. The prism can be used, for example, in the device as per FIG. 1.
Figure 2B:
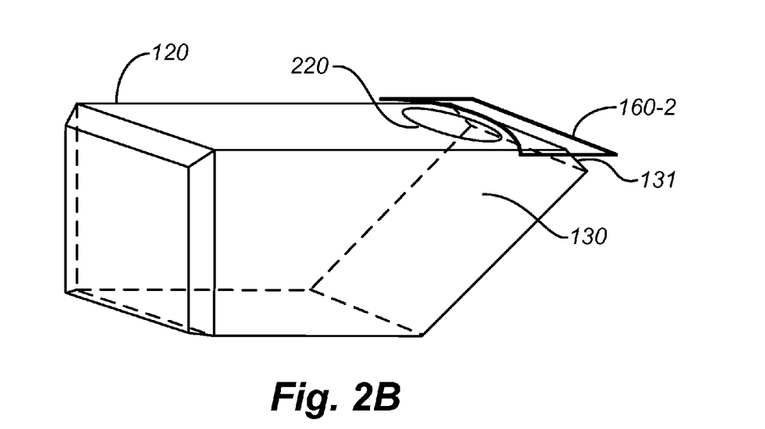

FIGS. 2A and 2B show an embodiment form of a prism for the array for measurement by means of a light ray from FIG. 1.

Here, prism 120 has a slanted surface 130, to couple the measurement light from light source 140, shown in FIG. 2A, into the optical path as shown for example in FIG. 1. In manufacturing a prism for a device for measurement by means of a light ray as per the invention, as shown in FIG. 2A, usually the edge 131 of the slanted surface that forms an acute angle with the surface of prism 120 is chamfered or slanted, to prevent formation of fragments and roughness in the edge area during the cutting and grinding process.

The light ray from the light source, for example light source 140 from FIG. 1, is incident along direction 201 in FIG. 2A on slanted surface 130, and, due to the 45° inclination of the slanted surface, the light ray is coupled along direction 202 onto the optical axis. A part of the light ray that is incident along direction 201 from the light source to slanted surface 130, is, however, reflected or scattered from the canted edge 131, and uses a direct path to get inside the device, i.e., not via the object, to receiver 150 from FIG. 1. To prevent the light ray from the light source from impinging on canted edge 131, a covering device 160-1 is attached on canted edge 131, which prevents measurement light emitted from light source 140, illustrated by arrow 203, from being directly incident on edge 131. Generally with this embodiment form, at least one edge of the prism is covered on the slanted surface of the prism so that the light ray emitted by the light source is not incident on the at least one edge.

Preferably covering device 160-1 has an antireflection coating or is of antireflecting material and provided with edge areas not rounded off, so it generates as little stray light itself as possible. As illustrated in FIG. 2A, covering device 160-1 is situated in the same plane or placed parallel to a plane in which the upper side 210 of prism 120 is located. However, also covering device 160-1 can be inclined relative to surface 210 of prism 120, for example with the edge lying away from the prism directed upwards.

Alternatively, the covering device can comprise a non-reflecting coating on a section of the prism.

Covering device 160-1 can be glued onto prism 120 in the area of upper surface 210, or be mounted or attached to the prism with lateral straps.

In advantageous fashion, prism 120 like the entire device for measurement by means of a light ray, as shown for example in FIG. 1, can be manufactured in a conventional manner. Only in a further processing step is covering device 160 or 160-1 attached to prism 120, which makes it possible that prism 120 does not have to be ordered with additional adaptations.

FIG. 2B shows an additional embodiment form of prism 120, for example from FIG. 1, to prevent stray light from being generated through incident measurement light from a light source, for example light source 140 in FIG. 1. The light source is not shown in FIG. 2B, but it can be situated as shown in FIG. 2A. As per 2B, similar to covering device 160-1 from FIG. 2A, a covering device 160-2 is now made available that has an edge which is rounded lying in the direction of the lens array. Since the light ray of the light source, such as a laser source, has a circular or elliptical cross section, the form of covering device 160-2 in FIG. 2B can prevent the light ray from being excessively screened by the covering device, and not able to be fully coupled into the optical path. One possible area of incidence of the light ray such as laser light from light source 140 is illustrated in FIG. 2B at reference symbol 220.

Also, covering device 160-2 prevents the light ray from light source 140 from being directly incident on edge 131. The other features of covering device 160-2 may be similar to covering device 160-1.

Figure 3:
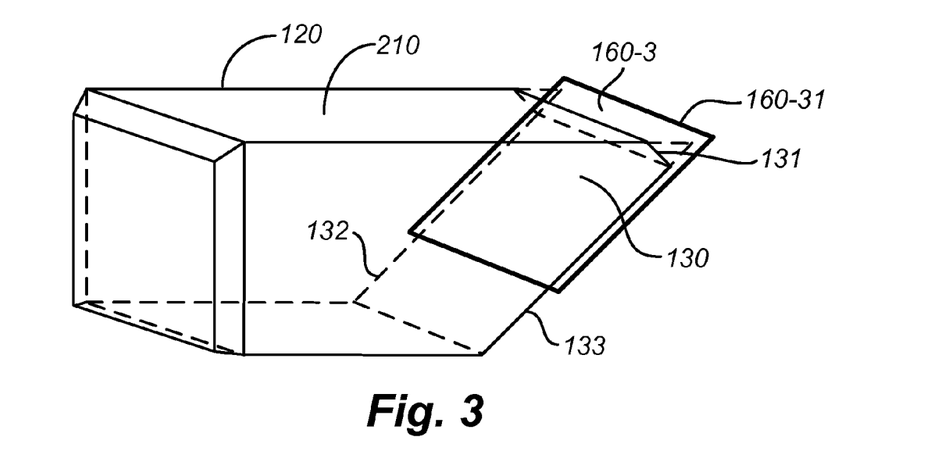
FIG. 3 shows a prism for a device for measuring by means of a light ray as per an embodiment form of the invention, with a covering device to eliminate stray light on a slanted surface of the prism.

FIG. 3 shows another embodiment form of the covering device to reduce or eliminate stray light, for example for the device for measurement by means of measurement light as per FIG. 1. FIG. 3 show a possible embodiment form of the covering device, 160-3, which is attached in the area of slanted surface 130 of prism 120. Covering device 160-3 preferably projects beyond canted edge 131 of the prism to the extent that stray light or reflected measurement light possibly formed at edge 131 cannot impinge directly on the receiver. For example, edge 160-31 of covering device 160-3 may lie in the plane that is formed by upper side 210 of prism 120, so that measurement light from the lens array passing by on prism 120 is not prevented from being incident on the receiver.

Generally with this embodiment form, at least one edge of the prism is canted, and the covering device is attached on the slanted surface of the prism so that it covers stray light from the at least one canted edge of the prism on the slanted surface of the prism so that the stray light from the edge is not incident on the receiver.

Covering device 160-3 can for example be glued on slanted surface 130 and partially cover it, as shown in FIG. 3. Alternatively, covering device 160-3 can also cover the entire slanted surface 130. The other properties of covering device 160-3 correspond to those of the covering devices of FIGS. 2A and 2B.

Figure 4:
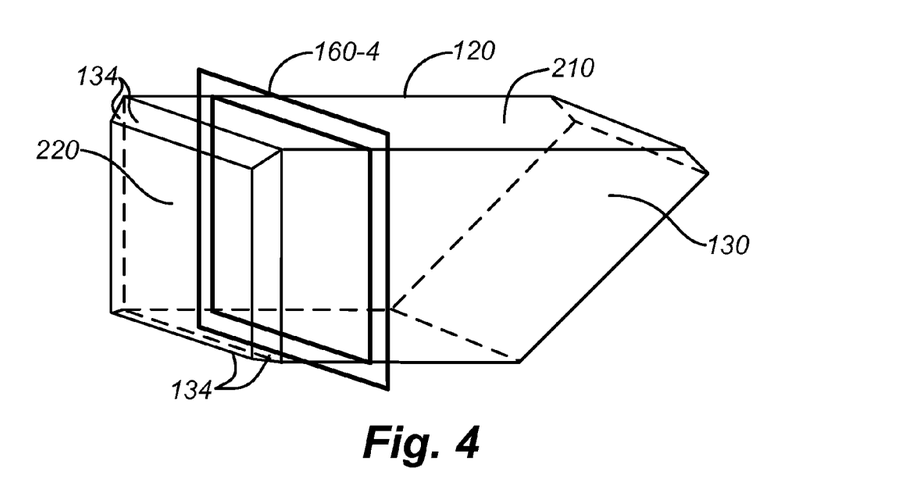
FIG. 4 shows a prism for a device for measurement by means of a light ray as per an embodiment form of the invention, with a covering device to eliminate stray light that has a frame shape.

FIG. 4 shows another embodiment form of a covering device to eliminate stray light for a prism as for example prism 120 from FIG. 1.

In the process of manufacturing the device, for example the device from FIG. 1, prism 120 normally is glued onto lens array 100. Depending on the manufacturing process, a small quantity of adhesive gets compressed out of the area where the prism adjoins the lens array, in the area of surface 220 of the prism, and forms an adhesive bead, even if the front side of the prism is canted.

It was explained above that due to slanted surface 130 of the prism, the measurement light is coupled into the optical path. With this, parts of the measurement light also are incident on the above-mentioned projecting adhesive or the adhesive bead in the area of edge 134, and there are reflected or scattered. The stray light from these areas of the prism and the lens array are reflected or scattered in the direction of the receiver, for example receiver 150 from FIG. 1, and impair the properties of the device.

For screening of such a type, for example, of stray light, according to the embodiment form in FIG. 4, a screening device 160-4 is provided, which encircles prism 120 in the shape of a frame. Since stray light generated at the location of adhesion is directed outside the prism in the area of the surface of the prism in the direction of the receiver, covering device 160-4 can prevent this stray light from being incident on the receiver, for example receiver 150 from FIG. 1. Preferably, covering device 160-4, at right angles to optical axis 110 from FIG. 1 has a recess, which covers stray light from the area where prism 120 and lens array 100 are connected, but usable light that is reflected from the object and passes through lens array 100 only to a small degree.

Generally speaking, with this embodiment form, the covering device covers stray light generated at the location where the prism is connected with one of the lenses so that the stray light is not incident on the receiver. The thickness of the covering device at the location where it covers at least one of the sides of the prism is chosen so that the covering device covers stray light from one edge of the prism at the point of connection with one of the lenses. Additionally, the thickness of the covering device at the location where it covers at least one of the sides of the prism can be chosen so that the covering device covers stray light from an adhesive bead at the point where the prism is connected with one of the lenses.

In addition, covering device 160-4 can be placed to prevent propagation of stray light as effectively as possible in the immediate vicinity of the connection area of the prism with the lens array, or also at another place in the path of the stray light to receiver 150.

Preferably covering device 160-4 is optimized so that the ratio of usable light to stray light is the greatest. In other words, covering device 160-4 is so arranged and dimensioned that the ratio of usable light reflected from the object of interest that is incident on receiver 150 to the stray light generated in the area of the device itself, which is incident on receiver 150, is maximal.

In other words, in this embodiment form, the covering device can project over a cross section placed at right angles to the optical axis of the prism by a projecting length, with the projecting length being chosen so that the ratio of usable light to stray light is maximal. The usable light is a share of the measurement light incident on the receiver, reflected from the object, and the stray light is a share of the light ray incident on the receiver that is reflected or scattered from the prism.

Figure 6A:
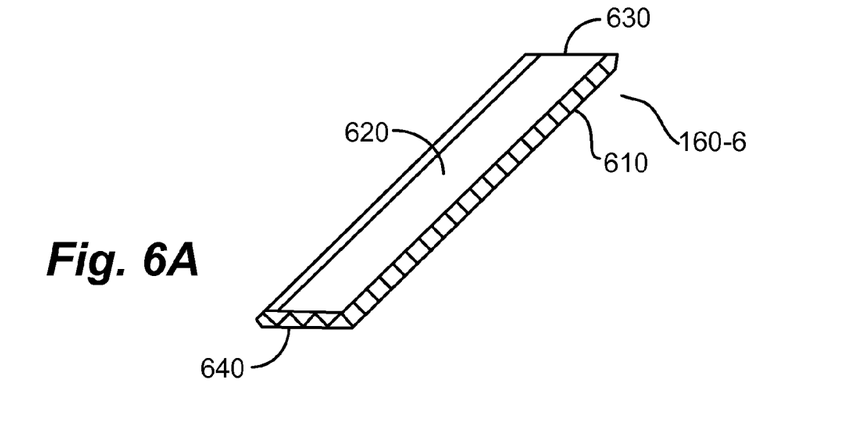
FIGS. 6a, 6b and 6c show views of a covering device for a device for measurement by means of a light ray as per one embodiment form of the invention. The covering device can be mounted on a prism on a slanted surface.

FIG. 6 shows an additional embodiment form of a covering device to prevent stray light that is generated at prism 120, for example of the device from FIG. 1, from being incident on receiver 150.

Figure 5:
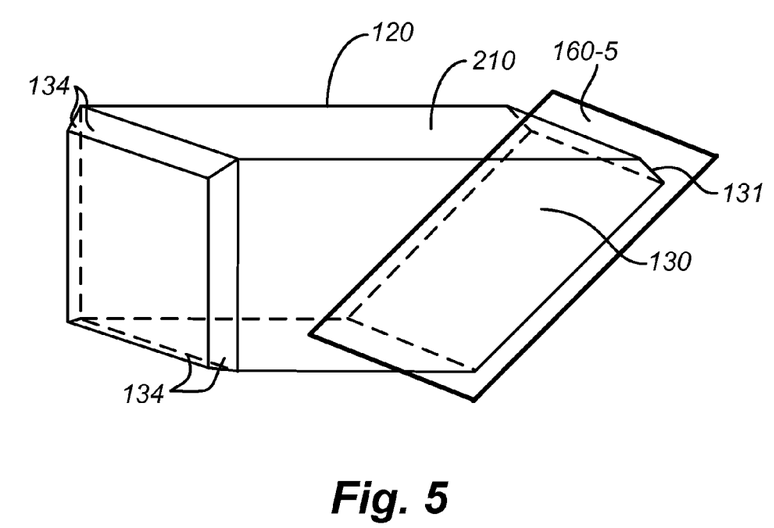
FIG. 5 shows a prism for a device for measurement by means of a light ray as per an embodiment form of the invention, with a covering device to eliminate stray light, which is placed on the slanted surface of the prism.

The covering device from FIG. 5, covering device 160-5, is attached in the area of slanted surface 130 of the prism, and is provided for this to prevent stray light generated in the area of canted edge 131 on the slanted surface from being incident on the receiver, as well as to prevent stray light generated at the point where prism 120 is connected with lens array 100 from being incident on receiver 150.

For this, covering device 160-5 is dimensioned so that it projects out on one side, but preferably on every side of slanted surface 130 over the slanted surface, and in fact so that also in the area of canted edge 131 it projects over an imaginary extension of the upper side of prism 210.

Due to the arrangement, stray light formed on canted edge 131 is screened off, and also stray light generated at the point where the prism is connected with the lens array, which runs in the vicinity of the surface of the prism in the direction of the receiver, is likewise effectively screened off.

As previously in the arrangement of FIG. 4, the projecting length of covering device 160-5 over the lateral surfaces of the prism or over the extension of lateral surface 210 of the prism is of such type that the ratio of usable light incident on the receiver to stray light is maximized.

Figure 6B:
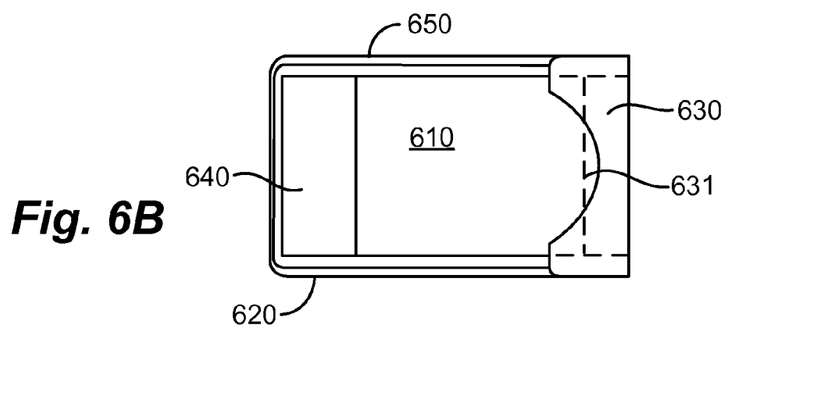
Figure 6C:
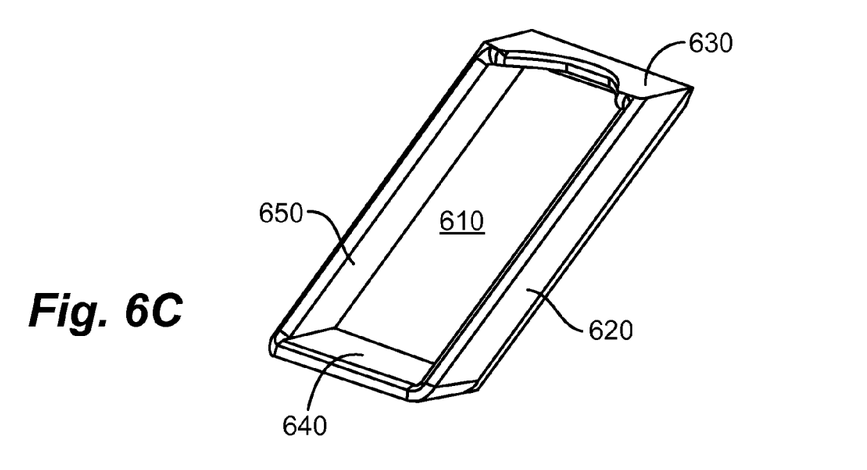

FIGS. 6A, 6B and 6C show another embodiment form of covering device 160 from FIG. 1. FIG. 6A shows a side view of covering device 160-6. FIG. 6B shows a top view of the covering device and FIG. 6C shows a slanted view of the covering device.

Covering device 160-6 from FIGS. 6A, 6B and 6C is open on one side and box-shaped, and can be placed on slanted surface 130 of prism 120, and cover at least two of the lateral surfaces of the prism at least partially.

For this, the covering device has a back surface 610 which adjoins slanted surface 130 of the prism, as well as a lateral surface 630 which adjoins surface 210 of the prism, a lateral surface 640, which adjoins the side of the prism opposite surface 210, and lateral surfaces 620 and 650, which likewise adjoin the lateral surfaces of prism 120.

Lateral surface 630, as shown in FIG. 6B, has a rounded recess, to be as little hindrance as possible to the circular or elliptical cross section of the light ray, as already described with reference to FIG. 2B. However, as shown in FIG. 2A, surface 630 of the rounded recess alternatively can have a straight edge. An example of such a straight edge is designated in FIG. 6B by 631. Preferably lateral surface 630 is dimensioned so that, as viewed in the direction of the light ray from light source 640, it covers only canted edge 131 or slightly more than canted edge 131, and thus does not lie over lateral surface 210 of the prism or only slightly so, so as not to lie in the propagation path of the light beam. In contrast, sides 620, 640 and 650 can project further over the particular lateral surfaces of the prism, since they do not lie in the area of light ray propagation.

Preferably, the lateral surfaces and back surface 610 of covering device 160-6 are shaped so that the covering device can be placed onto the prism in the area of slanted surface 130, and has clamped contact with it, so that the covering device cannot get loose by itself from the prism, even when subjected to shaking Alternative or additional to this, the covering device also can be glued to prism 120.

Figure 7:
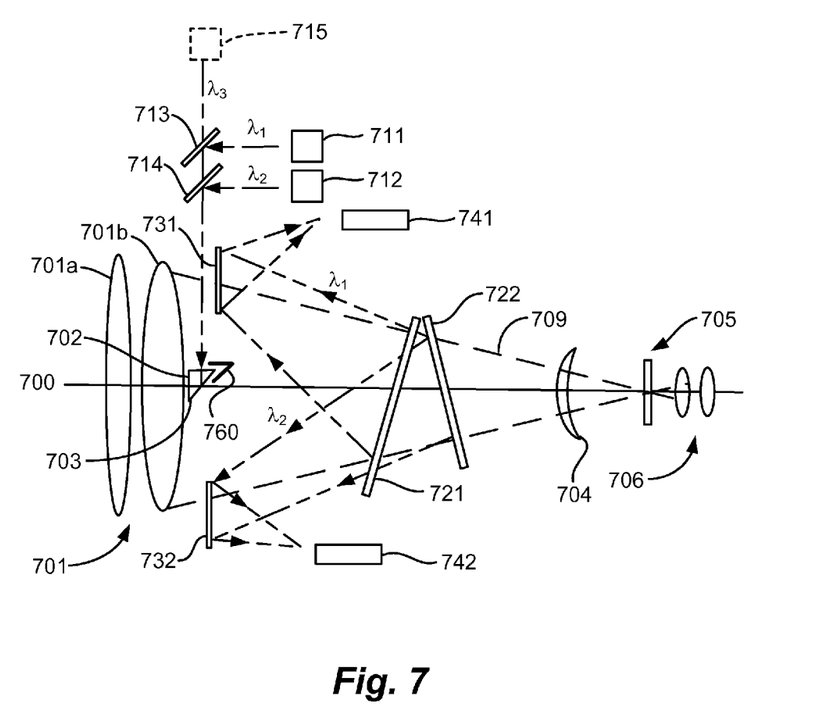
FIG. 7 shows an array of a device for measurement by means of a light ray as per a further embodiment form of the invention.

FIG. 7 shows another embodiment form of the device for measurement by means of a light ray.

The device according to FIG. 7 shows a lens array 701 with lenses 701a and 701b, that define an optical axis 700. On lens axis 700, a focusing lens 704 and crosshairs 705 are placed.

As known from prior art, focusing lens 704 is movable, to focus incident light onto crosshairs 705. The image can be viewed through an eyepiece 706. For the lens, and preferably in the interior area of lens 701b, a prism 702 is made available, with a reflecting surface 703 on the optical axis 700. Surface 703 of prism 702 can have a dichroic coating. Prism 703 serves to reflect light rays lambda λ1 and λ2 from transmitters 711 and 712, for example laser transmitters, or laser-emitting diodes, to make available a transmission light path. The light is directed outward through lens array 701 in the direction of a target lens.

The prism has a lateral surface tilted by 45°, and thus causes a 90° deflection of incident light of the incident light of light rays λ1 and λ2. The light rays reach the prism at right angles to the optical axis, and thus are coupled into the optical axis. This simplifies the arrangement, as already explained for FIG. 1, but is not necessary. Other arrangements than right-angle are possible for light rays λ1 and λ2.

The two light rays λ1 and λ2 emerge coaxially from lens array 701, as shown in the figure. For this, the transmitters are so arranged that rays λ1 and λ2 are each reflected on a mirror 713 and 714, so that the light rays reflected in such a way form the coaxial ray that is incident on prism 702.

The light reflected from the object reaches lens array 701 as a ray that consists of the transmitting wavelengths, and which normally is expanded so that it covers the entire lens area. It is understood that the prism 702 is small with regard to the entire area of lens array 702, and thus covers only a relatively small part of the reflected light.

Viewed in the direction of the optical axis, prism 702 may have a rectangular or square cross section. However, it is also possible that the prism does not have a cross section with radial symmetry, to reduce the covering of the share of light reflected from the target object.

Two dichroic plates 721 and 722 are placed in tipped fashion in the reflected light ray on optical axis 700 between prism 702 and crosshairs 705. In this connection, tipped means that they are not placed at right angles to the optical axis. Thus a part of the light ray with the wavelength lambda 1 is reflected at the first tipped plate 721 in the direction of mirror 731, which in turn reflects the light ray in the direction of detector 741. In the same manner, the other part of the ray with the wavelength lambda 2 passes through first plate 721 and is incident on second tipped plate 722, where it is reflected, in the direction of second mirror 732, which in turn reflects the ray in the direction of a detector 742. The two receivers or detectors 741 and 742 are placed outside light path 709, which is formed by lens 701.

In the present embodiment example, an additional emitter 715 is placed at right angles to the optical axis, and this emitter can emit a wavelength λ3. This light ray with wavelength λ3 can for example be used to emit a visible ray to align the device to a target.

The reflected light detected from the object by receivers 741 and 742 can be evaluated to derive for example a measured distance to the object, as is known from prior art.

In its present embodiment form, prism 702 in FIG. 7 is configured as it was described with reference to one or more of the foregoing figures. As an example, in FIG. 7 the covering device 760 is shown.

A manufacturing process for a device for measurement by means of a light ray may comprise: placement of lenses along an optical axis; placement of a prism on one of the lenses, whereby the prism has a slanted surface, for coupling of a light ray from a light source placed lateral to the optical axis into the optical axis, so that the light ray can pass through the array of lenses along the optical axis; placement of a receiver for receipt of a share of the light ray reflected from an object; and placement, on the prism, of a covering device for at least one area of the prism that scatters or reflects a share of the light ray as stray light to the receiver.

The covering device can be so attached that it covers at least an edge of the prism on the slanted surface of the prism, so that the light ray emitted by the light source is not incident on the at least one edge.

Additionally with the manufacturing process, at least one edge of the prism can be canted and the covering device can be attached to the slanted surface of the prism and cover stray light from the at least one canted edge of the prism on the slanted surface of the prism so that stray light from the edge is not incident on the receiver.

Additionally, the covering device can be attached so that it covers stray light generated at the point where the prism is connected with one of the lenses so that the stray light is not incident on the receiver.

At any point during manufacturing, the covering device can be placed on the prism and at least partially cover at least two of the lateral surfaces of the prism.

The covering device can be chosen to provide less coverage of the lateral surface of the prism, on which the light ray emitted from the light source is incident, than coverage of other covered lateral surfaces.

Additionally, the thickness of the covering device at the location where it covers at least one of the sides of the prism, can be chosen so that the covering device covers stray light from an edge of the prism at the point of connection with one of the lenses.

The thickness of the covering device at the location where it covers at least one of the sides of the prism can be chosen so that the covering device covers stray light from an adhesive bead at the point of connection of the prism with one of the lenses.

Lastly, the covering device can also be dimensioned so that it projects over a cross section lying at right angles to the optical axis of the prism by a projecting length. The excess can be so chosen that the ratio of usable light to stray light is maximal. The usable light is a share of the measurement light reflected from the object and incident on the receiver, and the stray light is an undesired share of the measurement light incident on the receiver that is reflected or scattered from the prism, incident on the receiver.

With the manufacturing process for the embodiment forms described above, the covering device may be attached at a suitable time, or an existing measuring device can be retrofitted, by attaching the covering device after manufacturing.

What is claimed is:

1. A device for measurement by means of a light ray, the device including:
    an array of lenses along an optical axis;
    a prism attached to one of the lenses, the prism having a slanted surface for coupling of the light ray from a light source placed lateral to the optical axis onto the optical axis, wherein the slanted surface includes a canted edge;
    a receiver for receipt of a share of the light ray reflected from an object; and
    a covering device for at least one area of the prism, wherein the covering device is disposed adjacent to the slanted surface of the prism and covers the slanted surface by extending substantially parallel to the slanted surface, wherein the covering device projects past an edge of the slanted edge to block light reflecting off the canted edge from reaching the receiver.

2. The device of claim 1 wherein the covering device is attached to the slanted surface of the prism.

3. The device of claim 1 wherein an edge of the covering device lies in a plane formed by an upper side of the prism.

4. The device of claim 1 wherein the covering device covers the entire slanted surface.

5. The device of claim 1 wherein the covering device covers a portion of the slanted surface.

6. The device of claim 1 wherein the covering device projects past more than one edge of the slanted surface.

7. The device of claim 1 wherein the covering device has a non-reflective surface.

8. The device of claim 1 wherein the covering device comprises unrounded edges.

9. The device of claim 1 wherein the covering device is coupled to the prism.

10. A manufacturing process for a device for measurement by means of a light ray, the manufacturing process including:
    placement of lenses along an optical axis;
    placement of a prism on one of the lenses, whereby the prism has a slanted surface for coupling of the light ray incident from a light source placed lateral to the optical axis onto the optical axis;
    placement of a receiver for receipt of a share of the light ray reflected from an object; and
    coupling, to the prism, a covering device for covering at least one area of the prism, wherein the covering device is disposed adjacent to the slanted surface of the prism and covers the slanted surface by extending substantially parallel to the slanted surface, wherein the covering device is coupled to the prism such that the covering device projects past the slanted surface to block light reflected from a canted edge of the prism.

11. The manufacturing process of claim 10 wherein the prism is placed on one of the lenses by at least adhering the prism to the one of the lenses.

12. The manufacturing process of claim 11 wherein the prism is glued to the one of the lenses.

13. The manufacturing process of claim 10 wherein the covering device is coupled to the prism by at least attaching the covering device to the prism with an adhesive.

14. The manufacturing process of claim 10 wherein the covering device is coupled to the prism such that the covering device projects past more than one edge of the slanted surface.

15. The manufacturing process of claim 10 wherein the covering device is coupled to the prism such that an edge of the covering device lies in a plane formed by an upper side of the prism.

16. A device for measurement by means of a light ray, the device including:
- an array of lenses along an optical axis;
- a prism attached to one of the lenses, the prism having a slanted surface for coupling of the light ray from a light source placed lateral to the optical axis onto the optical axis;
- a receiver for receipt of a share of the light ray reflected from an object; and
- a covering device for at least one area of the prism, wherein the covering device is disposed adjacent to the slanted surface of the prism and covers the slanted surface by extending substantially parallel to the slanted surface, wherein the covering device extends past an edge of the slanted surface.

* * * * *